United States Patent Office 3,418,948
Patented Dec. 31, 1968

3,418,948
CHAIN DRIVEN CONVEYOR SYSTEM HAVING DRIVING MEMBERS
Hans-Georg Fromme and Franz Nadler, Wetzlar, Germany, assignors to Fromme Forderanlagen G.m.b.H., Wetzlar, Germany
Filed Feb. 20, 1967, Ser. No. 617,258
Claims priority, application Germany, Feb. 23, 1966, F 48,514, Patent 1,238,399
5 Claims. (Cl. 104—172)

ABSTRACT OF THE DISCLOSURE

A conveyor system adapted to transport goods in holders from one place to another. The holders are movable along a fixed trackway under the propulsion of a driving chain running along parallel guide means above and in vertical alignment with said trackway. The chain is provided with rollers journaled on the link pins between the chain links. Driving members are rested on two consecutive link pins by means of two oblong holes. The front oblong hole in the direction of chain travel extends horizontally, i.e., parallel to the direction of transportation. The rear hole extends slightly inclined to the vertical direction. The oblong holes are specially shaped to cater for any reverse of propulsion which may occur while the conveyor system transports the holders on a descending section of the trackway.

BACKGROUND OF THE INVENTION

Field of the invention

This invention pertains to conveyor systems of the type in which the goods to be transported are placed in or on holders. Said holders are guided along a fixed trackway and are propelled by a driving roller type chain running in guide means above and in vertical alignment with the trackway.

Description of the prior art

It is well known to provide the driving chains of the above mentioned type of conveyor systems with driving members such as pawls. The pawls are placed between the two side portions of one chain link and are pivotable about the link pin. A portion of the pawl is formed into a catch and is adapted to interengage the holder and impart a positive drive thereto. The catch, however, is subject to considerable wear which results in its edges being rounded. If the pivot of the pawl in the direction of chain travel is located in front of the point of impact of the propelling force the catch will become easily disengaged from the holder thus causing the holder to be unintentionally released from the driving chain between two stations. This will particularly occur if the chain during its travel tends to flutter owing to small obstacles in the path of the chain rollers or merely to a rugged surface of the roller guide.

Summary of the invention

The conveyor system according to our invention avoids these disadvantages by the following means: The driving members are provided with two oblong holes and by means of these holes are placed on two consecutive link pins. The front hole extends in the direction of the chain travel whereas the rear hole extends almost perpendicular thereto, i.e., in a more vertical direction. It is essential, however, that the direction in which the rear hole extends is inclined by a small degree to said vertical direction. Both holes are spaced from each other sufficiently for the driving members to rest during normal transportation conditions on the front pin with about the middle of the front hole.

The driving force is imparted by the chain to the driving member by means of the rear pin which acts on the one edge of the rear oblong hole. Since the catch of the driving member is located between the two holes, i.e., in front of the point of impact of the propelling force, the holders are pushed during transportation rather than pulled.

The small angle by which the rear oblong hole according to the invention is inclined to the vertical direction causes the edges of the hole to act in a wedgelike manner in cooperation with the link pin whenever the driving member, for instance by fluttering chain travel, is pushed upwards into a pivoting motion about the front link pin. The catch is thus prevented from becoming unintentionally detached from the holder. This being particularly so if the rear oblong hole is inclined with its lower end spaced away from the vertical in the direction opposite to the direction of chain travel.

Driving members with oblong holes shaped and arranged in the predescribed manner will operate satisfactorily on all horizontal trackway sections. On descending sections of the trackway, however, a reverse of propulsion occurs in that the driving force is no longer imparted by the chain to the driving member and on to the holder. It is rather the holder which by the force of gravity propels the driving member and the chain which results in the driving member being pushed on the pins in the forward direction. The driving members can then easily pivot in a counterclockwise direction about the front pin thus releasing the holders from the catch.

It is therefore a further object of our invention to provide means adapted to prevent any unintentional release of the holder from the chain on a descending section of the trackway. In one embodiment of our invention this means consists of oblong holes in the driving member, the front hole being shaped to resemble the numeral 7, the rear hole, on the other hand, being shaped to resemble the mirror image of that numeral. The oblong holes are spaced from each other in such a way that during conventional chain travel through horizontal sections of the trackway the front pin will rest in about the middle of the horizontal part of the oblong hole, whereas the rear pin will rest in the corner of the joint section of the two oblong hole branches which together form the above mentioned mirror image of the numeral 7. Pivoting of the driving member in a counterclockwise direction about the front pin is prevented by the edge of the lower branch of the rear oblong hole which cooperates with its pin in the above mentioned wedgelike manner. Upon reverse of propulsion the driving member will be pushed relative to the pins thus causing the front pin to rest in the corner of the joined hole branches and the rear pin to rest in the middle part of its horizontal oblong hole. It will then be the edge of the lower branch of the front oblong hole that prevents any unintentional pivoting motion of the driving member.

In another embodiment of our invention this means consists of a portion of the driving member extending from its upper part and being adapted to interengage the overhead portion of the roller guide rail. The latter being U-shaped with the U-shanks bent over inwardly to provide running surfaces for the rollers. Pivoting of the driving member is prevented by the overhead portion of the guide rails which keeps the driving member down and does not allow for any space which would be necessary for such pivoting. Apertures are provided in said overhead guide rail portion at the stations where the holders are to be released from the chain. At these places stop members are arranged for the driving members to abut against which results in the driving members pivoting about their front pins, during which motion the extensions from their upper parts reach into said apertures. The catches thereby become uncoupled from the holders.

*Description of the drawings*

Preferred embodiments of the invention are illustrated by way of example in the accompanying drawings in which.

*Description of the preferred embodiments*

Figure 1:
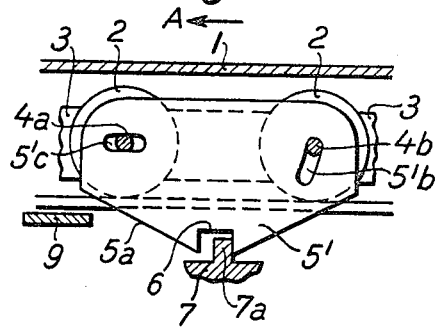
FIGS. 1 and 2 each show schematically a driving member with two oblong holes, the front hole extending in horizontal direction, the rear hole extending in a direction inclined to the vertical line.

In the FIGURES 1 through 5 the numeral 1 designates the guide rail for the rollers 2. The guide rail 1 being of U-shaped cross section with the two shanks bent over at their respective ends to provide the running surface for the rollers 2. The latter are arranged in pairs as is readily discernible from FIG. 5 and are journaled on link pins 4a, 4b which interconnect the chain links 3a, 3b (FIG. 5) in a manner known per se.

Figure 2:
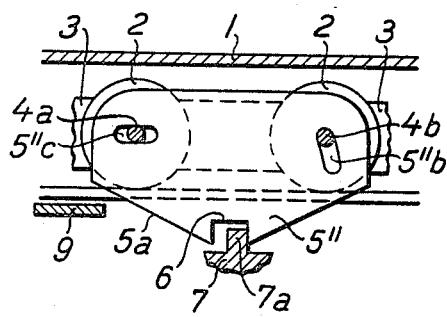
Figure 3:
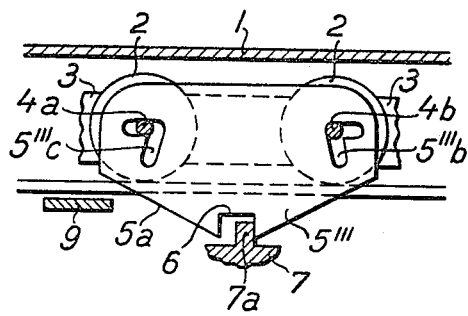
FIG. 3 shows a driving member with two oblong holes shaped to resemble respectively the numeral 7 and its enantiomorph.

On the link pins 4a, 4b rest the driving members 5' (FIG. 1), 5" (FIG. 2), 5''' (FIG. 3), by means of their respective oblong holes 5'b, 5'c (FIG. 1); 5"b, 5"c (FIG. 2); 5'''b, 5'''c (FIG. 3).

In the embodiment illustrated in FIG. 1 the front oblong hole 5'c extends in the direction of chain travel as indicated by arrow A and rests upon the front pin 4a at about the middle of the hole. The rear oblong hole 5'b extends almost vertically. Its direction however is slightly inclined to the exact vertical line with the lower hole end spaced from this line in the direction of chain travel. By means of this oblong hole 5'b the driving member 5' rests on the rear pin 4b. A catch 6 is provided at the lower end of the driving member for engaging the holder 7 whose protruding latch portion 7a is shown.

In the embodiment of the invention according to FIG. 1 the propelling force is transmitted by the link pin 4b to the front edge of hole 5'b and is in turn transmitted to the holder 7 by the lower portion of driving member 5', the latter being shaped to serve as catch 6 and being adapted to engage the latch 7a of holder 7.

The rear edge of the rear oblong hole 5'b by virtue of its inclination toward the vertical line acts in a wedgelike manner upon the rear pin 4b whenever the driving member 5' tends to pivot about the front pin 4a owing to fluttering chain travel or to obstacles in the path of the rollers 2.

The embodiment of the invention according to FIG. 2 differs from the one illustrated in FIG. 1 merely by the direction in which the rear oblong hole 5"b extends. This hole is also inclined to the vertical line; in contradistinction to the embodiment according to FIG. 1 its lower hole end, however, being spaced from the vertical line in the direction opposite to the direction of chain travel. In the present embodiment it is the front edge of the rear hole 5"b which acts in the aforedescribed wedgelike manner on the rear pin 4b. Since this front edge is also the point or rather the edge of impact of the propelling force the wedgelike function of this edge is supported by the friction occurring between the rear pin 4b and said front edge.

In FIG. 3 an embodiment of the invention is shown which in addition to those according to FIGS. 1 and 2 also provides for any reverse of propulsion as may occur on a descending section of the trackway. In this embodiment the front oblong hole 5'''c is shaped to resemble the numeral 7 and the rear oblong hole is shaped to resemble the mirror image of this numeral.

The driving member 5''' rests on the front link pin 4a with about the middle section of the horizontal branch of the hole 5'''c, whereas it rests on the rear link pin 4b with the joint sections of the horizontal and the rear vertical branches of hole 5'''b. The lower portion of the driving member 5''' is again shaped to serve as catch 6 and engages the projecting latch 7a of holder 7.

During conventional horizontal travel of chain and holder conditions will prevail as illustrated by FIG. 3. The propelling force will be transmitted by the rear link pin 4b to the front edge of hole 5'''b and in turn by the driving member 5''' to holder 7. The front edge of hole 5'''b again preventing by wedgelike action any unintentional pivoting motion of driving member 5'''.

If the goods, however, are to be transported on a descending section of the trackway the holder 7 may become accelerated by forces of gravity to a speed greater than the chain speed. The latch 7a will then abut against the front edge of catch 6 and will thus pull the driving member 5''' in the direction of chain travel. The driving member 5''' will move relative to the pins 4a, 4b until the front pin 4a abuts against the rear edge of hole 5'''c. It will then be the rear pin 4b that is placed in about the middle of the horizontal branch of its corresponding oblong hole 5'''b. Consequently under this adjustment it will be the rear edge of the front hole 5'''c that by a wedgelike action prevents any undesired pivoting of the driving member 5''', which would then occur about the rear pin 4b as the pivot.

Figure 4:
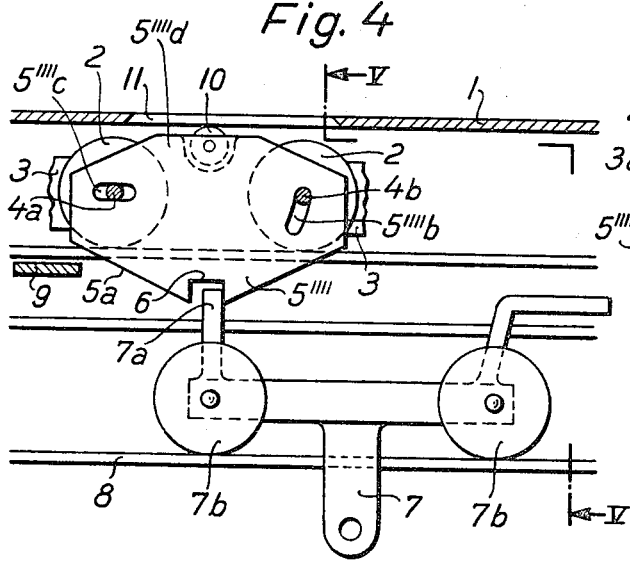
FIG. 4 shows a driving member with oblong holes according to FIG. 1 and with an additional upper extension of the driving member.
Figure 5:
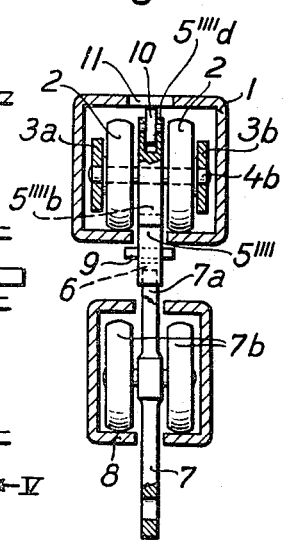
FIG. 5 is a sectional view of FIG. 4 along the line V—V.

In FIGS. 4 and 5 an embodiment of the invention is illustrated which is much related to the one depicted in FIG. 1. The driving member 5'''' is provided with oblong holes 5''''b and 5''''c shaped and arranged in the same manner as described with reference to FIG. 1. The catch 6 is again a portion of the driving member and engages the latch 7a of the holder 7 which is shown with rollers 7b rolling in the trackway 8. In addition to the embodiment according to FIG. 1 the driving member 5'''' is provided with the portion 5''''d projecting from its upper side to just below the overhead portion of guide rail 1. The roller 10 is journaled in portion 5''''d for rolling on said overhead portion of guide rail 1. By doing so in this embodiment the roller 10 in addition to the wedgelike action of the rear edge of hole 5''''b also prevents any pivoting of the driving member 5'''' and consequently any unintentional release of holder 7.

The overhead portion of guide rail 1 is designed to provide a continuous running surface for roller 10. At the stations where the holders are to be released said guide rail portion, however, is provided with apertures 11 sufficiently large to allow for the driving members to be pivoted in counterclockwise direction by the stop member 9. During this pivoting motion the projecting portion 5''''d moves into the aperture 11. The catch 6 is lifted from the latch 7a, thus releasing the holder 7.

What we claim is:

1. A conveyor system comprising a guide rail (1) of inverted U-shaped cross section with the lower portions of the two shanks bent inwardly, a chain formed of pivotally connected links (3) carrying pivot pins for supporting rollers (2) in position for travelling along the inwardly bent portions of the shanks, a flat driving member with a pair of oblong openings through which a pair of said pivot pins extend to support the driving member, one of the oblong openings extending in the direction of travel while the other oblong opening extends transverse to the direction of travel, the lower portion of the driving member being provided with a catch (6) to engage a holder (7) and also with an inclined edge in front of the catch to tilt the driving member about one of the pivot pins when a stop member (9) is encountered to disengage the driving member from the holder (7).

2. The conveyor system of claim 1, in which the transversely extending oblong opening is inclined in the direction of travel of the chain.

3. The conveyor system of claim 1, in which the transversely extending oblong opening is inclined in a direction opposite to the direction of travel of the chain.

4. The conveyor system of claim 3, in which the rear oblong opening is provided with a horizontal branch extending from its upper end in a direction opposite to the direction of travel of the chain so as to have the form of a mirror image of the numeral 7 the front oblong opening being provided with a branch extending transverse to the direction of travel and inclined in the direction of travel so that the two openings will appear in side view as enantiomorphs of the numeral 7, the two openings being at such a distance from each other than when the front pivot pin is in the middle of the horizontal branch of the front opening, the rear pivot pin will be at the front end of the horizontal branch of the rear opening.

5. The conveyor system of claim 1, in which the guide rail has an opening (11) in its upper portion and the driving member carries a roller (10) at its upper edge in position to normally travel in the guide rail but adapted to enter the opening (11) when the driving member encounters a stop (9).

References Cited

UNITED STATES PATENTS 3,242,874  3/1966  Orwin _____ 104—178

ARTHUR L. LA POINT, *Primary Examiner.*

D. F. WORTH, *Assistant Examiner.*

U.S. Cl. X.R.

104—178